March 15, 1927.

G. MACLOSKIE 1,621,328

SAFETY CAR CONTROL EQUIPMENT

Filed July 20, 1926

Inventor:
George Macloskie,
by
His Attorney.

Patented Mar. 15, 1927.

1,621,328

UNITED STATES PATENT OFFICE.

GEORGE MACLOSKIE, OF ERIE, PENNSYLVANIA, ASSIGNOR TO GENERAL ELECTRIC COMPANY, A CORPORATION OF NEW YORK.

SAFETY CAR-CONTROL EQUIPMENT.

Application filed July 20, 1926. Serial No. 123,756.

My invention relates to safety car control equipments in which the brakes are automatically applied when the motorman removes his hand from the controller handle.

One object of my invention is to provide an improved arrangement for rendering the safety control feature of a car inoperative without affecting the operation of the brake equipment so that the car can be used as a trailer and the brakes thereof controlled by the safety car control equipment on the head operating car.

In accordance with my invention, I provide an arrangement whereby the safety control feature is rendered inoperative when the handle is removed from the device which is adapted to be operated to apply the brakes.

My invention will be better understood from the following description taken in connection with the accompanying drawing, and its scope will be pointed out in the appended claims.

Figure 1:
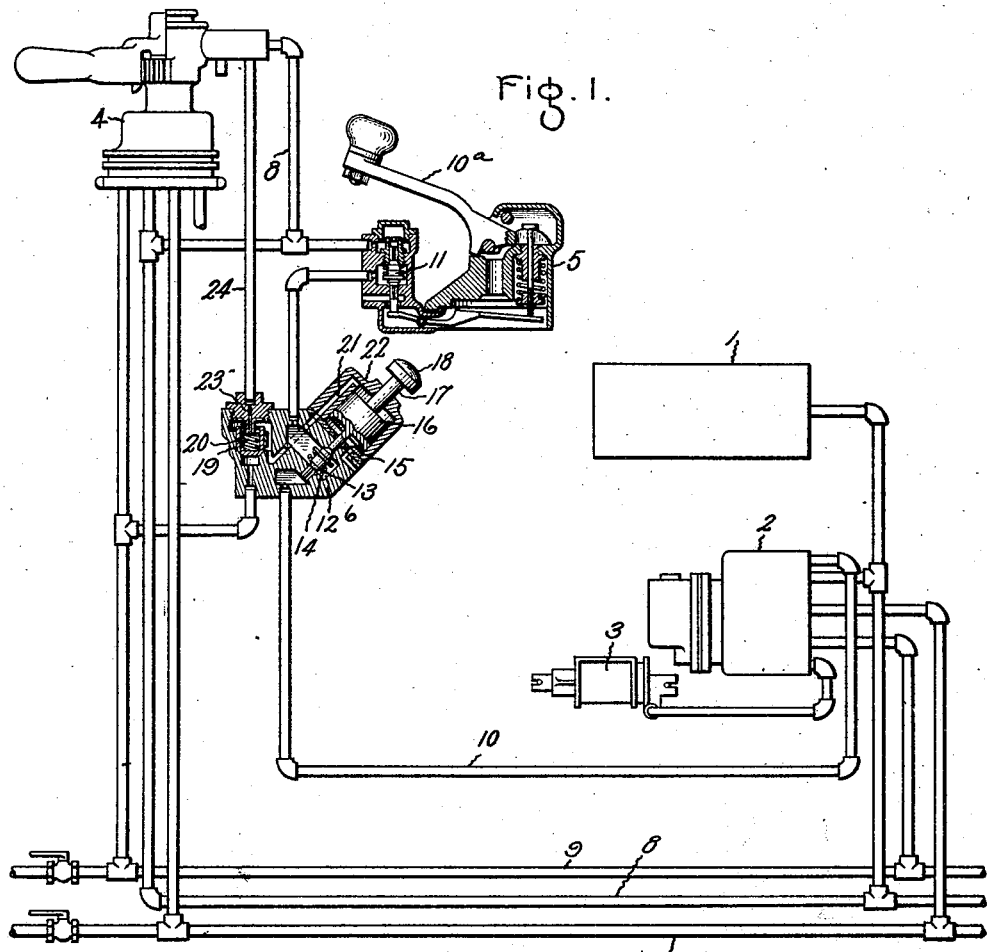
Figure 2:
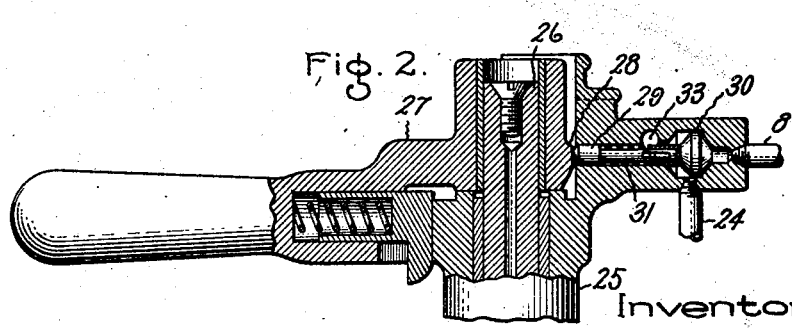

In the accompanying drawing, Fig. 1 is a diagrammatic showing, partly in section, of a safety car control equipment embodying my invention, and Fig. 2 is a sectional view of a motorman's brake valve which may be used in the equipment shown in Fig. 1.

The safety car control equipment shown in Fig. 1 is well known in the art, and comprises a main reservoir 1, an emergency valve 2, a brake cylinder 3, a motorman's brake valve 4, a safety car controller handle device 5, a combined cut-off and foot valve device 6, an emergency pipe 7, a main reservoir pipe 8, straight air pipe 9, and safety car control pipe 10.

The safety car controller handle device 5 comprises a controller handle 10$^a$ and a double beat pilot valve 11 adapted, when the controller handle is released, to vent fluid from the safety control pipe 10 to atmosphere and when the controller handle is depressed to supply fluid under pressure from the main reservoir pipe 8 to the safety control pipe 10.

The emergency valve 2 is arranged in a manner well known in the art so that it is operated, when the fluid pressure in the safety control pipe 10 decreases below a predetermined value, to effect an emergency application of the brakes. Therefore, whenever fluid is vented from the safety control pipe 10 by the motorman releasing the control handle 10$^a$, an emergency application of the brakes is effected.

The combined cut-off and foot valve device 6 is used to cut off communication between the safety control pipe 10 and the pilot valve 11 whenever a straight air application of the brakes is made or the valve is actuated manually by the operator so that the controller handle 10$^a$ can be released without effecting an emergency application of the brakes.

The valve device 6 comprises a casing having a valve chamber 12 containing a valve 13 for controlling communication through the safety control pipe 10. The valve 13 is normally held open by a spring 14. The closing of the valve is effected through a stem 15 which engages a piston 16 and the piston is adapted to be operated by a stem 17 which has attached thereto a foot piece 18.

The piston 16 is also adapted to be operated by fluid from the straight air pipe 9 whenever the pressure therein is sufficient to open a normally closed valve 19 which is subject, on one side, to the pressure of a spring 20, and subject on the other side to the pressure in the straight air pipe. The valve 19, when open, establishes communication from the straight air pipe to the passage 21, which is connected to the piston chamber 22 of the piston 16. A passage 23, which is normally connected to atmosphere through a pipe 24, is normally connected to a passage 21 and the piston valve 19 is arranged to cut off communication between these two passages when the valve is moved by fluid pressure in the straight air pipe 9.

According to my invention, there is interposed in the pipe 24 a suitable valve device which is actuated, whenever the motorman's brake valve handle is removed, to cut off communication between the pipe 24 and atmosphere and to establish communication between the pipe 24 and a suitable source of fluid pressure whereby the piston 16 is actuated to close the cut off valve 13. Fig. 2 is a sectional view of a brake valve device which may be used. As shown in this figure, the brake valve device comprises a casing 25 containing the usual rotary valve (not shown) having a valve stem 26 which is adapted to be operated by removable handle 27. The brake valve handle is provided with a lug 28, which when the handle is on the stem 26, engages a stem 29 attached to a double beat valve 30 to hold it in the position shown in the drawing against the force exerted thereon by a spring 31. When the double beat valve 30 is held in the position shown, communication is established between the pipe 24 and an exhaust port 33.

When the handle 27 is removed from the stem 26, the spring 31 moves the valve 30 to the left, thereby cutting off communication between pipe 24 and the exhaust port 33 and establishing communication between the main reservoir pipe 8 and the pipe 24. Therefore, whenever the handle is on the stem 26, the safety control feature is operative, since the pipe 24 is connected to atmosphere and fluid is vented from the safety control pipe in case the motorman releases his controller handle 10ª without first applying the brakes or operating the foot valve. When, however, the brake valve handle 27 is romoved from the stem 26, main reservoir pressure is supplied through pipe 24 and passages 23 and 21 of the combined cut off and foot valve 6 to the piston chamber 22 so that the piston 16 is operated to close the cut-off valve 13. The safety control feature is thereby rendered inoperative, so that the car can be used as a trailer in a train and the air brakes thereon controlled in the usual manner by the motorman on the head car.

It will be observed that when the car is being operated as a trailer and a straight air application of the brakes is made the valve 19 does not open, because of the pressure in the passage 21.

While I have, in accordance with the patent statutes, shown and described my invention as applied to a particular system and as embodying various devices, changes and modifications will be obvious to those skilled in the art and I, therefore, aim in the appended claims to cover all such changes and modifications as fall within the true spirit and scope of my invention.

What I claim as new and desire to secure by Letters Patent of the United States is:—

1. In a safety car control equipment, the combination with a brake valve having a removable handle, a controller handle, and a valve operated upon the release of the controller handle for venting fluid to effect an application of the brakes, of means operative upon the removal of the handle of said brake valve for effecting the closing of the communication through which fluid is vented by the operation of said valve which is operated upon release of the controller handle.

2. In a safety car control equipment, the combination with a brake valve having a removable handle, a controller handle, and a valve operated upon the release of the controller handle for venting fluid to effect an application of the brakes, of another valve controlling the communication through which fluid is vented by said valve which is operated upon the release of the controller handle and operative upon the removal of the handle of said brake valve to close said communication.

3. In a safety car control equipment, the combination with a brake valve having a removable handle, a controller handle, and a pilot valve operated upon the release of the controller handle for venting fluid to effect an application of the brakes, of a valve for cutting off communication through which the pilot valve vents fluid, a piston for actuating said valve, a source of fluid pressure, and valve means operated in response to the removal of the handle of said brake valve for establishing communication between said source of fluid pressure and said piston whereby said piston actuated valve is actuated to cut off communication through which the pilot valve vents fluid.

4. In a safety car control equipment, the combination with a brake valve having a removable handle, a controller handle, and a pilot valve operated upon the release of the controller handle for venting fluid to effect an application of the brakes, of a valve for cutting off communication through which the pilot valve vents fluid, a piston for actuating said valve, a source of fluid pressure, and a valve device adapted to be held by the handle of said brake valve in a position to cut off the communication between said piston and source when the handle is on said brake valve and to be operated when said handle is removed to establish communication between said piston and said source.

5. In a safety car control equipment, the combination with a source of fluid pressure, a safety control pipe, a controller handle, a pilot valve operated upon the release of said controller handle for venting fluid from said control pipe, a fluid pressure operated valve in said safety control pipe adapted to cut off communication from said safety control pipe to said pilot valve, a straight air pipe, a motorman's brake valve having a removable handle, a normally closed valve adapted to be opened by fluid in said straight air pipe to establish communication from said straight air pipe to said fluid operated valve in said safety control pipe to cut off communication from said safety control pipe to said pilot valve, and means operative upon the removal of the handle of said brake valve to prevent the operation of said normally closed valve by fluid in said straight air pipe and to effect the operation of said fluid operated valve in said safety control pipe.

6. In a safety car control equipment, the combination with a brake valve having a removable handle, a controller handle and a valve operated upon the release of the controller handle for effecting an application of the brakes, of means arranged upon the removal of the handle of said brake valve to prevent the application of the brakes upon release of the controller handle.

7. In a safety car control equipment, a device having a removable handle adapted to be operated to apply the brakes, a controller handle and means controlled thereby arranged to effect an application of the brakes when the controller handle is released, and means arranged upon the removal of the handle of said device for rendering said controller handle inoperative to apply the brakes when said controller handle is released.

In witness whereof, I have hereunto set my hand this 17th day of July 1926.

GEORGE MACLOSKIE.